United States Patent
Chang et al.

(10) Patent No.: US 11,061,500 B2
(45) Date of Patent: Jul. 13, 2021

(54) TOUCH DISPLAY DRIVING APPARATUS AND OPERATION METHOD THEREOF

(71) Applicant: HIMAX TECHNOLOGIES LIMITED, Tainan (TW)

(72) Inventors: Yaw-Guang Chang, Tainan (TW); Wei-Song Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/563,951

(22) Filed: Sep. 9, 2019

(65) Prior Publication Data
US 2020/0356204 A1 Nov. 12, 2020

Related U.S. Application Data

(60) Provisional application No. 62/843,580, filed on May 6, 2019.

(51) Int. Cl.
*G06F 3/041* (2006.01)
*G06F 3/042* (2006.01)

(52) U.S. Cl.
CPC .......... *G06F 3/0412* (2013.01); *G06F 3/0421* (2013.01)

(58) Field of Classification Search
CPC ............... G06F 3/0412; G06F 3/041
See application file for complete search history.

(56) References Cited

U.S. PATENT DOCUMENTS

| | | | | |
|---|---|---|---|---|
| 2012/0050216 A1* | 3/2012 | Kremin | ............... | G06F 3/044 345/174 |
| 2015/0185941 A1* | 7/2015 | Lee | ............... | G06F 3/04166 345/173 |
| 2016/0077624 A1 | 3/2016 | Zhao et al. | | |
| 2016/0320882 A1* | 11/2016 | Kim | ............... | G06F 3/0416 |
| 2017/0242529 A1* | 8/2017 | Park | ............... | G09G 3/20 |

FOREIGN PATENT DOCUMENTS

| | | |
|---|---|---|
| CN | 103870054 | 6/2014 |
| CN | 104166489 | 11/2014 |
| CN | 104679342 | 6/2015 |
| CN | 106055151 | 10/2016 |

OTHER PUBLICATIONS

"Office Action of Taiwan Counterpart Application", dated Jul. 29, 2020, p. 1-p. 3.

* cited by examiner

*Primary Examiner* — Alexander Eisen
*Assistant Examiner* — Cory A Almeida
(74) *Attorney, Agent, or Firm* — JCIPRNET

(57) ABSTRACT

A touch display driving apparatus and an operation method thereof are provided. A display frame period is divided into a plurality of display driving periods and a plurality of touch driving periods. During the display driving periods, the display driver circuit drives a touch display panel. During the touch driving periods, the touch driver circuit detects common electrode rows of the touch display panel. The common electrode rows are parallel to a plurality of gate lines of the touch display panel. Each of the common electrode rows serves as a current common electrode row, wherein the current common electrode row covers a plurality of corresponding gate lines of the gate lines. The touch driving period during which the current common electrode row being detected is not temporally adjacent to the display driving period during which the corresponding gate lines being driven.

8 Claims, 2 Drawing Sheets

TOUCH DISPLAY DRIVING APPARATUS AND OPERATION METHOD THEREOF

CROSS-REFERENCE TO RELATED APPLICATION

This application claims the priority benefit of U.S. provisional application Ser. No. 62/843,580, filed on May 6, 2019. The entirety of the above-mentioned patent application is hereby incorporated by reference herein and made a part of this specification.

BACKGROUND OF THE INVENTION

1. Field of the Invention

The present invention relates to a touch apparatus, and more particularly to a touch display driving apparatus and an operating method thereof.

2. Description of Related Art

Electronic devices with touch and display functions (e.g., mobile phones, tablet computers, notebook computers, etc.) are becoming more and more popular. In-cell touch display panels have emerged in response to the thinning of electronic devices. In the structure of the in-cell touch display panel, the common electrode layer (VCOM) of a pixel circuit is divided into a plurality of blocks (a plurality of common electrodes) as touch sensing electrodes for detecting touch events. During the display driving period, the common electrode layer is electrically connected to a common voltage (or VCOM voltage) to ensure that the pixel liquid crystal can operate at the correct voltage. During the touch driving period, the common electrode layer is electrically connected to a touch sensing circuit for touch sensing. Therefore, the common electrode layer performs a display operation or a touch sensing operation in a time sharing manner.

One touch frame of the touch sensing operation is divided into a plurality of touch driving periods, and one display frame of the display operation is divided into a plurality of display driving periods. The touch driving periods are inserted between the display driving periods. In general, the update frequency of the touch sensing operation is greater than the update frequency of the display operation. For example, the update frequency of the display operation is 60 Hz, and the update frequency of the touch sensing operation is 120 Hz. Thus, for the same common electrode, it is scanned (sensed) twice in one display frame. In any case, in addition to the common electrode layer, the touch display panel also includes data lines (source lines) and scan lines (gate lines). In the same display frame, when a common electrode is scanned (sensed) for the first time, the corresponding gate lines covered by the common electrode have more charge because they have just been scanned (driven), but when the common electrode is scanned (sensed) for the second time, the corresponding gate lines covered by the common electrode have less charge because they had not been scanned (driven) for a long time. It is conceivable that there is a difference that cannot be ignored between the result of the first touch sensing and the result of the second touch sensing of the common electrode because of a difference in charge of the corresponding gate lines. For the touch sensing operation, this difference is like a noise signal. This difference will affect the judgment of the touch, which in turn affects the accuracy of the touch.

It should be noted that the information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides a touch display driving apparatus and an operation method thereof to improve the accuracy of touch.

An embodiment of the present invention provides a touch display driving apparatus. The touch display driving apparatus includes a display driver circuit and a touch driver circuit. The display driver circuit is configured to drive a plurality of gate lines of a touch display panel during a display frame period to display an image frame. The display frame period is divided into a plurality of display driving periods and a plurality of touch driving periods, and the display driver circuit drives the touch display panel during the display driving periods. The touch driver circuit is configured to detect a plurality of common electrode rows of the touch display panel during the touch driving periods to detect a touch event. The common electrode rows are parallel to the gate lines, each of the common electrode rows serves as a current common electrode row, the current common electrode row covers a plurality of corresponding gate lines of the gate lines, and the touch driving period during which the current common electrode row is detected is not temporally adjacent to the display driving period during which the corresponding gate lines are driven.

An embodiment of the present invention provides an operation method of a touch display driving apparatus. The operation method includes: dividing a display frame period into a plurality of display driving periods and a plurality of touch driving periods; driving, by a display driver circuit, a plurality of gate lines of a touch display panel during the display driving periods to display an image frame; and detecting, by a touch driver circuit, a plurality of common electrode rows of the touch display panel during the touch driving periods to detect a touch event. The common electrode rows are parallel to the gate lines, each of the common electrode rows serves as a current common electrode row, the current common electrode row covers a plurality of corresponding gate lines of the gate lines, and the touch driving period during which the current common electrode row is detected is not temporally adjacent to the display driving period during which the corresponding gate lines are driven.

Based on the above, according the touch display driving apparatus and the operation method thereof of the embodiments of the present invention, the display frame period is divided into a plurality of display driving periods and a plurality of touch driving periods. The touch driving period during which the current common electrode row is detected is not temporally adjacent to the display driving period during which the corresponding gate lines covered by the current common electrode row are driven. Therefore, in the same display frame, assuming that the touch event does not occur, the result of the first touch sensing of the current common electrode row can be as close as possible to the result of the second touch sensing of the current common electrode row. Thus, the touch display driving apparatus can improve the accuracy of touch.

In order to make the aforementioned and other objectives and advantages of the present invention comprehensible, embodiments accompanied with figures are described in detail below.

DESCRIPTION OF THE EMBODIMENTS

Figure 1:
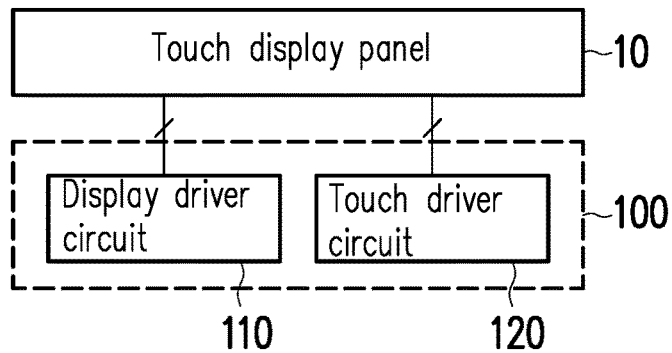
FIG. 1 is a circuit block diagram of a touch display apparatus according to an embodiment of the present invention.

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name components (elements) or to distinguish between different embodiments or ranges, and are not intended to define the upper or lower limit of the number of components or the order of components. Wherever possible, the same reference numbers are used in the drawings and the description to refer to the same or like parts, components or steps. For parts, components or steps denoted by same reference numbers or names, reference can be made to the related descriptions.

FIG. 1 is a circuit block diagram of a touch display apparatus according to an embodiment of the present invention. The touch display apparatus shown in FIG. 1 includes a touch display panel 10 and a touch display driving apparatus 100. The touch display driving apparatus 100 includes a display driver circuit 110 and a touch driver circuit 120. The present embodiment does not limit the implementation details of the display driver circuit 110. For example, the display driver circuit 110 may be a conventional display driver circuit or another display driver circuit. According to design requirements, in some embodiments, the display driver circuit 110 and the touch driver circuit 120 may be different two integrated circuits. In other embodiments, the display driver circuit 110 and the touch driver circuit 120 may be integrated in the same integrated circuit. The integrated circuit in which the display driver circuit 110 and the touch driver circuit 120 are integrated is generally referred to as a touch with display driver integration (TDDI) chip.

The display driver circuit 110 is coupled to data lines (source lines) and scan lines (gate lines) of the touch display panel 10. The display driver circuit 110 can drive the pixel matrix of the touch display panel 10 via the data lines and the scan lines during one display frame period to display the image frame.

Figure 2:
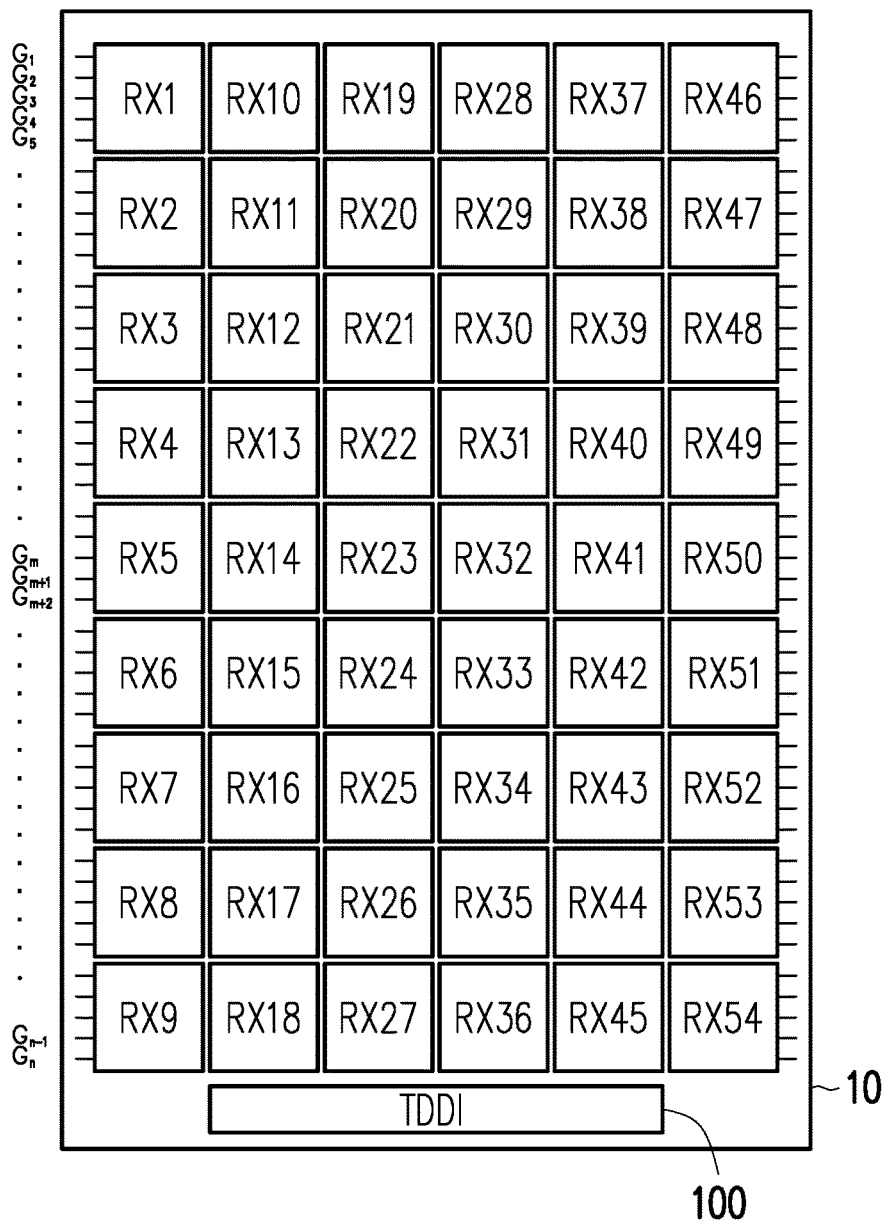
FIG. 2 is a schematic diagram showing the layout of a common electrode of the touch display panel of FIG. 1 according to an embodiment of the present invention.

FIG. 2 is a schematic diagram showing the layout of a common electrode of the touch display panel 10 of FIG. 1 according to an embodiment of the present invention. The common electrode layer (generally referred to as VCOM) of the touch display panel 10 is divided into a plurality of blocks (a plurality of common electrodes) to form an electrode matrix. In the embodiment shown in FIG. 2, the common electrode layer is divided into 54 common electrodes RX1-RX54. During the display driving period, the common electrodes RX1-RX54 are electrically connected to a common voltage (or VCOM voltage) to ensure that the pixel liquid crystal can operate at the correct voltage. During the touch driving period, the common electrodes RX1-RX54 (as touch sensing electrodes) are electrically connected to the touch sensing circuit 120 of the touch display driving apparatus 100 to detect a touch event. That is, the common electrodes RX1-RX54 of the touch display panel 10 perform a display operation and a touch sensing operation in a time sharing manner.

Each row of the common electrodes RX1-RX54 may be referred to as the common electrode row. For example, the common electrodes RX1, RX10, RX19, RX28, RX37 and RX46 are the first common electrode row, and the common electrodes RX2, RX11, RX20, RX29, RX38 and RX47 are the second common electrode row. The remaining common electrode rows may be deduced from this. The touch sensing circuit 120 of the touch display driving apparatus 100 can scan the common electrode rows to complete the touch sensing operation of one touch frame.

In the embodiment shown in FIG. 2, the touch display panel 10 has gate lines $G_1$, $G_2$, $G_3$, $G_4$, $G_5$, ..., $G_m$, $G_{m+1}$, $G_{m+2}$, ..., $G_{n-1}$, $G_n$. The gate lines $G_1$-$G_n$ are parallel to the common electrode rows. The common electrode rows cover the gate lines $G_1$-$G_n$. When the touch sensing circuit 120 scans to the first common electrode row, the first common electrode row may be referred to as the current common electrode row, and the gate lines $G_1$-$G_5$ covered by the first common electrode row may be referred to as corresponding gate lines. When the touch sensing circuit 120 scans to the fifth common electrode row (common electrodes RX5, RX14, RX23, RX32, RX41 and RX50), the fifth common electrode row may be referred to as a current common electrode row, and the gate lines $G_m$, $G_{m+1}$, $G_{m+2}$ covered by the fifth common electrode row may be referred to as corresponding gate lines. The remaining common electrode rows and the remaining gate lines may be deduced from this.

Figure 3:
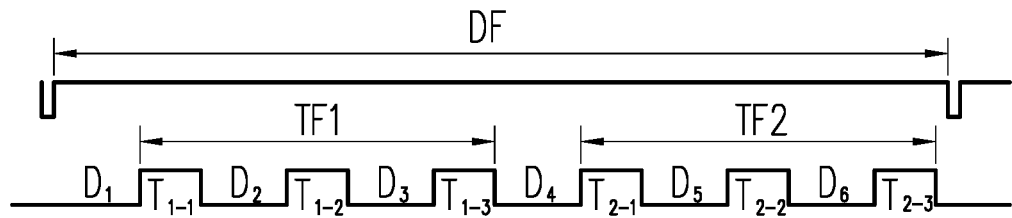
FIG. 3 is a schematic diagram showing the driving time sequence of the touch display driving apparatus of FIG. 1 according to an embodiment of the present invention.

FIG. 3 is a schematic diagram showing the driving time sequence of the touch display driving apparatus 100 of FIG. 1 according to an embodiment of the present invention. The vertical sync signal VSYNC can define a display frame period DF. The display driver circuit 110 of the touch display driving apparatus 100 can perform a display driving operation of one display frame during one display frame period DF. The display frame period DF is divided into a plurality of display driving periods (for example, $D_1$, $D_2$, $D_3$, $D_4$, $D_5$ and $D_6$) and a plurality of touch driving periods (for example, $T_{1-1}$, $T_{1-2}$, $T_{1-3}$, $T_{2-1}$, $T_{2-2}$ and $T_{2-3}$). The touch driving periods $T_{1-1}$, $T_{1-2}$ and $T_{1-3}$ shown in FIG. 3 are one touch frame period TF1, and the touch driving periods $T_{2-1}$, $T_{2-2}$ and $T_{2-3}$ are another touch frame period TF2. The touch sensing circuit 120 of the touch display driving apparatus 100 can perform a touch sensing operation of one touch frame during one touch frame period (for example, TF1 or TF2).

Figure 4:
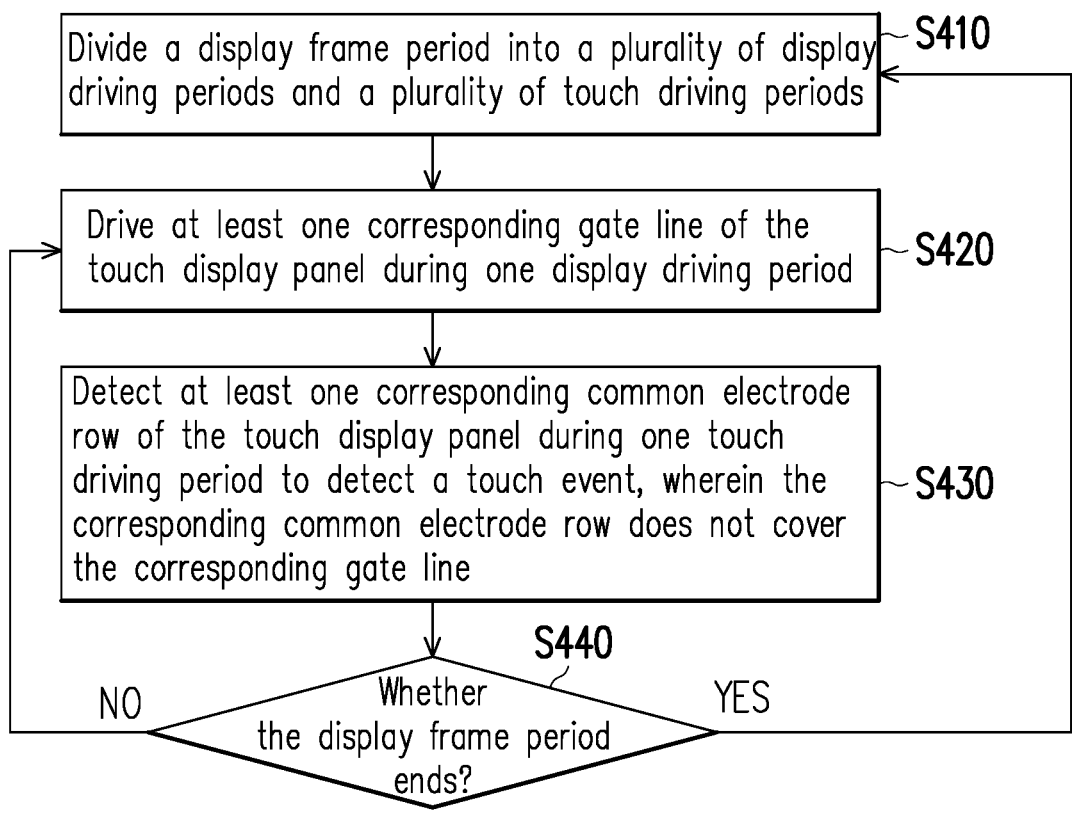
FIG. 4 is a flow chart showing an operation method of a touch display driving apparatus according to an embodiment of the present invention.

FIG. 4 is a flow chart showing an operation method of a touch display driving apparatus 100 according to an embodiment of the present invention. Referring to FIG. 1 to FIG. 4.

In step S410, the display frame period DF is divided into a plurality of display driving periods (for example, $D_1$-$D_6$) and a plurality of touch driving periods (for example, $T_{1-1}$-$T_{1-3}$ and $T_{2-1}$-$T_{2-3}$). The display driver circuit 110 can drive at least one corresponding gate line during one display driving period (for example, $D_1$) (step S420). The touch driver circuit 120 stops driving the touch display panel 10 during the display driving period $D_1$. Then, the touch sensing circuit 120 can detect at least one corresponding common electrode row during one touch driving period (for example, $T_{1-1}$) (step S430). The display driver circuit 110 stops driving the touch display panel 10 during the touch driving period $T_{1-1}$. The corresponding common electrode row detected in step S430 does not cover the corresponding gate line driven in step S420.

When the display frame period DF has not ended (NO in step S440), the display driver circuit 110 can drive at least one corresponding gate line during the next display driving period (for example, $D_2$) (step S420), and then the touch sensing circuit 120 can detect at least one corresponding common electrode row during the next touch driving period (for example, $T_{1-2}$) (step S430). And so on, until the display frame period DF ends. After the end of one display frame period DF (YES in step S440), the next display frame period is divided into a plurality of display driving periods and a plurality of touch driving periods (step S410).

For comparison, it is assumed here that the touch sensing circuit 120 sequentially scans (detects) the common electrodes in accordance with the common electrode column. The display driver circuit 110 can drive at least one corresponding gate line (for example, the gate lines $G_1$-$G_5$) during the display driving period $D_1$, and then the touch sensing circuit 120 can detect the first common electrode column (common electrodes RX1-RX9) and the sixth common electrode column (common electrodes RX46-RX54) during the touch driving period $T_{1-1}$, detect the second common electrode column (common electrodes RX10-RX18) and the fifth common electrode column (common electrodes RX37-RX45) during the touch driving period $T_{1-2}$, and detect the third common electrode column (common electrodes RX19-RX27) and the fourth common electrode column (common electrodes RX28-RX36) during the touch driving period $T_{1-3}$. The display driver circuit 110 can drive at least one corresponding gate line (for example, the gate lines $G_m$-$G_{m+2}$) during the display driving period $D_4$, and then the touch sensing circuit 120 can detect the first common electrode column and the sixth common electrode column again during the touch driving period $T_{2-1}$, detect the second common electrode column and the fifth common electrode column again during the touch driving period $T_{2-2}$, and detect the third common electrode column and the fourth common electrode column again during the touch driving period $T_{2-3}$. In the same display frame period DF, when the common electrode RX1 is scanned (detected) during the touch driving period $T_{1-1}$, the corresponding gate lines $G_1$-$G_5$ covered by the common electrode RX1 have more charge because they have just been scanned (driven), but when the common electrode RX1 is scanned (detected) during the touch driving period $T_{2-1}$, the corresponding gate lines $G_1$-$G_5$ covered by the common electrode RX1 have less charge because they have not been scanned (driven) for a long time. It is conceivable that there is a difference that cannot be ignored between the result of the touch sensing of the common electrode RX1 during the touch driving period $T_{1-1}$ and the result of the touch sensing during the touch driving period $T_{2-1}$ because of a difference in charge of the corresponding gate lines $G_1$-$G_5$. For the touch sensing operation, this difference is like a noise signal. This difference will affect the judgment of the touch, which in turn affects the accuracy of the touch.

The following describes an implementation example in which the touch sensing circuit 120 does not detect the common electrode rows according to the positions of the common electrode rows. That is, in the following embodiment, the touch driving period during which the current common electrode row is detected is not temporally adjacent to the display driving period in which the corresponding gate lines (the gate lines covered by the current common electrode row) are driven. For example, there is at least one other touch driving period (and/or at least one other display driving period) between the touch driving period during which the current common electrode row is detected and the display driving period during which the corresponding gate lines are driven. By making the touch driving period corresponding to the current common electrode row away from the display driving period corresponding to the corresponding gate lines, the difference in charge of the corresponding gate lines at different times can be reduced as much as possible. That is, in the case where the touch event does not occur, the difference between the touch sensing results of the same common electrode at different times can be reduced as much as possible.

In the present embodiment, the common electrode rows of the touch display panel 10 can be divided into a plurality of groups. For example, the first common electrode row (common electrodes RX1, RX10, RX19, RX28, RX37 and RX46), the second common electrode row (common electrodes RX2, RX11, RX20, RX29, RX38 and RX47) and the third common electrode row (common electrodes RX3, RX12, RX21, RX30, RX39 and RX48) are classified as the first group, the fourth common electrode row (common electrodes RX4, RX13, RX22, RX31, RX40 and RX49), the fifth common electrode row (common electrodes RX5, RX14, RX23, RX32, RX41 and RX50) and the sixth common electrode row (common electrodes RX6, RX15, RX24, RX33, RX42 and RX51) are classified as the second group, and the seventh common electrode row (common electrodes RX7, RX16, RX25, RX34, RX43 and RX52), the eighth common electrode row (common electrodes RX8, RX17, RX26, RX35, RX44 and RX53) and the ninth common electrode row (common electrodes RX9, RX18, RX27, RX36, RX45 and RX54) are classified as the third group. The touch driver circuit 120 scans the common electrode rows in each group in a certain identical scanning order (the scanning order is independent of the positions of the common electrode rows).

For example, the touch sensing circuit 120 drives (detects) the third common electrode row, the sixth common electrode row and the ninth common electrode row during the touch driving periods $T_{1-1}$ and $T_{2-1}$. During the touch driving periods $T_{1-2}$ and $T_{2-2}$, the touch sensing circuit 120 drives (detects) the first common electrode row, the fourth common electrode row and the seventh common electrode row. During the touch driving periods $T_{1-3}$ and $T_{2-3}$, the touch sensing circuit 120 drives (detects) the second common electrode row, the fifth common electrode row, and the eighth common electrode row. The common electrode RX1 and its corresponding gate lines $G_1$-$G_5$ are used as observation targets. The display driver circuit 110 can drive at least one corresponding gate line (for example, the gate lines $G_1$-$G_5$) during the display driving period $D_1$, and then the touch sensing circuit 120 can detect the common electrode RX1 during the touch driving periods $T_{1-2}$ and $T_{2-2}$. When the common electrode RX1 is detected during the touch driving period $T_{1-2}$, the corresponding gate lines $G_1$-$G_5$ covered by the common electrode RX1 have less charge because they have not been scanned (driven) for a long time. The difference in charge of the corresponding gate lines $G_1$-$G_5$ during the touch driving period $T_{1-2}$ and $T_{2-2}$ has been reduced as much as possible. That is, in the case where the touch event does not occur, the difference between the touch sensing results of the common electrode RX1 during the touch driving periods $T_{1-2}$ and $T_{2-2}$ can be reduced as much as possible.

According to different design requirements, the display driver circuit 110 and/or the touch driver circuit 120 may be implemented as hardware, firmware, software (i.e., program), or a combination of the foregoing.

In the form of hardware, the blocks of the display driver circuit 110 and/or the touch driver circuit 120 may be implemented in logic circuits on an integrated circuit. The related functions of the display driver circuit 110 and/or the touch driver circuit 120 may be implemented as hardware by using hardware description languages (such as Verilog HDL or VHDL) or other suitable programming languages. For example, the related functions of the display driver circuit 110 and/or the touch driver circuit 120 can be implemented in one or more controllers, microcontrollers, microprocessors, application-specific integrated circuits (ASICs), digital signal processors (DSPs), field programmable gate arrays (FPGAs), and/or various logic blocks, modules and circuits in other processing units.

In the form of software and/or firmware, the related functions of the display driver circuit 110 and/or the touch driver circuit 120 may be implemented as programming codes. For example, the display driver circuit 110 and (or) the touch driver circuit 120 are implemented by general programming languages (for example, C, C++, or a combination language) or other suitable programming languages. The programming codes may be recorded/stored in a recording medium, and the recording medium includes, for example, a read only memory (ROM), a storage device, and/or a random access memory (RAM). A computer, a central processing unit (CPU), a controller, a microcontroller or a microprocessor can read and execute the programming codes from the recording medium to achieve a related function. As the recording medium, a "non-transitory computer readable medium" can be used. For example, a tape, a disk, a card, a semiconductor memory, a programmable logic circuit, or the like can be used. Moreover, the program can also be provided to the computer (or CPU) via any transmission medium (communication network or broadcast wave, etc.). The communication network is, for example, the Internet, wired communication, wireless communication or other communication media.

Based on the above, according the touch display driving apparatus 100 and the operation method thereof of the embodiments of the present invention, the display frame period DF can be divided into a plurality of display driving periods $D_1$-$D_6$ and a plurality of touch driving periods $T_{1-1}$-$T_{1-3}$ and $T_{2-1}$-$T_{2-3}$. The touch driving period (for example, $T_{1-2}$ and $T_{2-2}$) during which the current common electrode row is detected is not temporally adjacent to the display driving period (for example, $D_1$) during which the corresponding gate lines (the gate lines covered by the current common electrode row) are driven. Therefore, in the same display frame DF, assuming that the touch event does not occur, the result of the first touch sensing of the current common electrode row can be as close as possible to the result of the second touch sensing of the current common electrode row. Thus, the touch display driving apparatus 100 can improve the accuracy of touch.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A touch display driving apparatus, comprising:
a display driver circuit, configured to drive a plurality of gate lines of a touch display panel during a display frame period corresponding to a vertical synchronization signal to display an image frame, wherein the display frame period comprises a plurality of display driving periods, a plurality of first touch driving periods included in a first touch frame period and a plurality of second touch driving periods included in a second touch frame period, and the display driver circuit drives the touch display panel during the display driving periods; and
a touch driver circuit, configured to detect a plurality of common electrode rows of the touch display panel during the first touch driving periods and the second touch driving periods to detect a touch event,
wherein each of the common electrode rows is one of rows of common electrodes, wherein the common electrode rows are parallel to the gate lines, each of the common electrode rows serves as a current common electrode row, the current common electrode row covers a plurality of corresponding gate lines of the gate lines, the touch driver circuit is configured to perform a touch sensing operation of a touch frame during each of the first touch frame period and the second touch frame period,
wherein in the display frame period, the touch driver circuit is configured to detect the current common electrode row during one of the plurality of first touch driving periods and during one of the plurality of second touch driving periods, and
the one of the plurality of the first touch driving periods is not temporally adjacent to the display driving period during which the corresponding gate lines are driven, and the one of the plurality of second touch driving periods is not temporally adjacent to the display driving period during which the corresponding gate lines are driven.

2. The touch display driving apparatus according to claim 1, wherein the display driver circuit stops driving the touch display panel during the first touch driving periods and the second touch driving periods, and the touch driver circuit stops driving the touch display panel during the display driving periods.

3. The touch display driving apparatus according to claim 1, wherein there is at least one other touch driving period or at least one other display driving period between the touch driving period during which the current common electrode row is detected and the display driving period during which the corresponding gate lines are driven.

4. The touch display driving apparatus according to claim 1, wherein the common electrode rows are divided into a plurality of groups, and the touch driver circuit scans the common electrode rows in each of the groups in an identical scanning order.

5. An operation method of a touch display driving apparatus, comprising:

dividing a display frame period corresponding to a vertical synchronization signal into a plurality of display driving periods, a plurality of touch first driving periods included in a first touch frame period and a plurality of second touch driving periods included in a second touch frame period;

driving, by a display driver circuit, a plurality of gate lines of a touch display panel during the display driving periods to display an image frame; and detecting, by a touch driver circuit, a plurality of common electrode rows of the touch display panel during the first touch driving periods and the second touch driving periods to detect a touch event, wherein each of the common electrode rows is one of rows of common electrodes, wherein the common electrode rows are parallel to the gate lines, each of the common electrode rows serves as a current common electrode row, the current common electrode row covers a plurality of corresponding gate lines of the gate lines, a touch sensing operation of a touch frame is performed during each of the first touch frame period and the second touch frame period, wherein in the display frame period, the touch driver circuit is configured to detect the current common electrode row during one of the plurality of first touch driving periods and during one of the plurality of second touch driving periods, and one of the plurality of the first touch driving periods is not temporally adjacent to the display driving period during which the corresponding gate lines are driven, and the one of the plurality of second touch driving periods is not temporally adjacent to the display driving period during which the corresponding gate lines are driven.

6. The operation method according to claim 5, further comprising:

stopping, by the display driver circuit, driving the touch display panel during the first touch driving periods and the second touch driving periods; and stopping, by the touch driver circuit, driving the touch display panel during the display driving periods.

7. The operation method according to claim 5, wherein there is at least one other touch driving period or at least one other display driving period between the touch driving period during which the current common electrode row is detected and the display driving period during which the corresponding gate lines are driven.

8. The operation method according to claim 5, wherein the common electrode rows are divided into a plurality of groups, and the touch driver circuit scans the common electrode rows in each of the groups in an identical scanning order.

* * * * *